May 13, 1969 H. W. DODDINGTON 3,444,327

IDLE TEST UNIT

Filed July 16, 1965

INVENTOR.
H. W. DODDINGTON

BY [signature]
ATTORNEY

United States Patent Office 3,444,327

Patented May 13, 1969

3,444,327

IDLE TEST UNIT

Harold William Doddington, Rio Piedras, Puerto Rico, assignor to International Telephone and Telegraph Corporation, a corporation of Delaware Filed July 16, 1965, Ser. No. 465,520
Int. Cl. H04m 3/56
U.S. Cl. 179—18 5 Claims

ABSTRACT OF THE DISCLOSURE

An idle test circuit comprises a resistor bridge which is unbalanced one way for busy conditions and another way for idle conditions. If two or more seizing circuits test the same idle circuit, both of the seizing circuits receive a busy signal. This circuit has special utility as a test circuit in a folded network.

This invention relates generally to automatic switching networks and more particularly to circuits for making an idle test to determine whether a switch path may be closed without a danger of causing a double connection.

Automatic switching systems are used to extend a switch path from an inlet demanding service through a network of crosspoints to a selected outlet. It is obvious that once such a path is completed, no other path may be connected thereto; or cross talk will occur between two unrelated connections. The problem is, therefore, to conduct a test which will determine whether an outlet is busy or idle before a path is completed to it.

If an outlet is tested for an idle condition simultaneously by two or more circuits seeking a switch path, either of two test results is permissible. First, one circuit making the test may be allowed to complete the desired switch path, and the other circuit making the test may be locked out. Second, both circuits making the test may be locked out, and neither of them will be allowed to complete the desired switch path. However, the testing circuit must be arranged so that it is never possible for both of the two switch paths which are seeking the connection to gain access to the same outlet at the same time.

Accordingly, an object of the invention is to provide new and improved test circuits for preventing double connections. Another object is to sense simultaneous demands for the same outlet and to bar access to the outlet by more than one of the demanding circuits.

A more specific object is to provide an idle condition detection circuit for an automatic switching system. Here an object is to provide low cost testing circuits which operate quickly and reliably. More specifically, an object is to provide idle condition detection circuits which do not require special purpose power supplies or other unusual circuits.

In keeping with one aspect of the invention, these and other objects are accomplished by a bridge circuit which is always unbalanced. The unbalance is in a first direction when a tested outlet is idle and in an opposite direction either when an outlet is busy or when it is being tested simultaneously by a number of circuits. A transistorized detector is coupled across the bridge at the points where a balance could occur. This detector is designed to give an output representing idle conditions when the bridge is unbalanced in the first direction and an output representing busy conditions when the unbalance is in the other direction.

The above mentioned and other objects and features of this invention and the manner of obtaining them will become more apparent and the invention itself will be best understood by reference to the following description of an embodiment of the invention taken in conjunction with the accompanying drawings in which.

Figure 1:
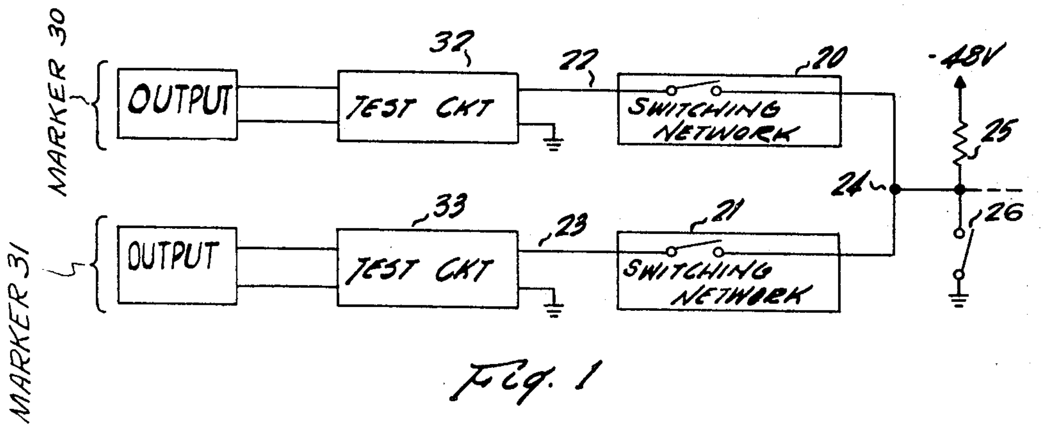
FIG. 1 is a block diagram which illustrates the principles of the invention.

As shown in FIG. 1, the switching system comprises one or more switching networks 20, 21. Each network has a plurality of inlets (such as 22, 23) on one side and outlets 24 on the other side. When the outlet 24 is idle, it is marked by a —48 v. potential applied through a resistor 25. When the outlet is busy, contacts 26 close to apply a busy ground marking.

A plurality of markers 30, 31 are provided to operate the switching networks 20, 21. Since these markers operate independently, they must be precluded from commanding the networks 20, 21 to make double connections. This operation of the two markers 30, 31 could occur either simultaneously or sequentially. Therefore, to avoid double connections, each of these two markers is provided with an idle test circuit 32, 33 which is interposed between each of the networks 20, 21, respectively, and an output control circuit associated therewith.

Figures 2, 3:
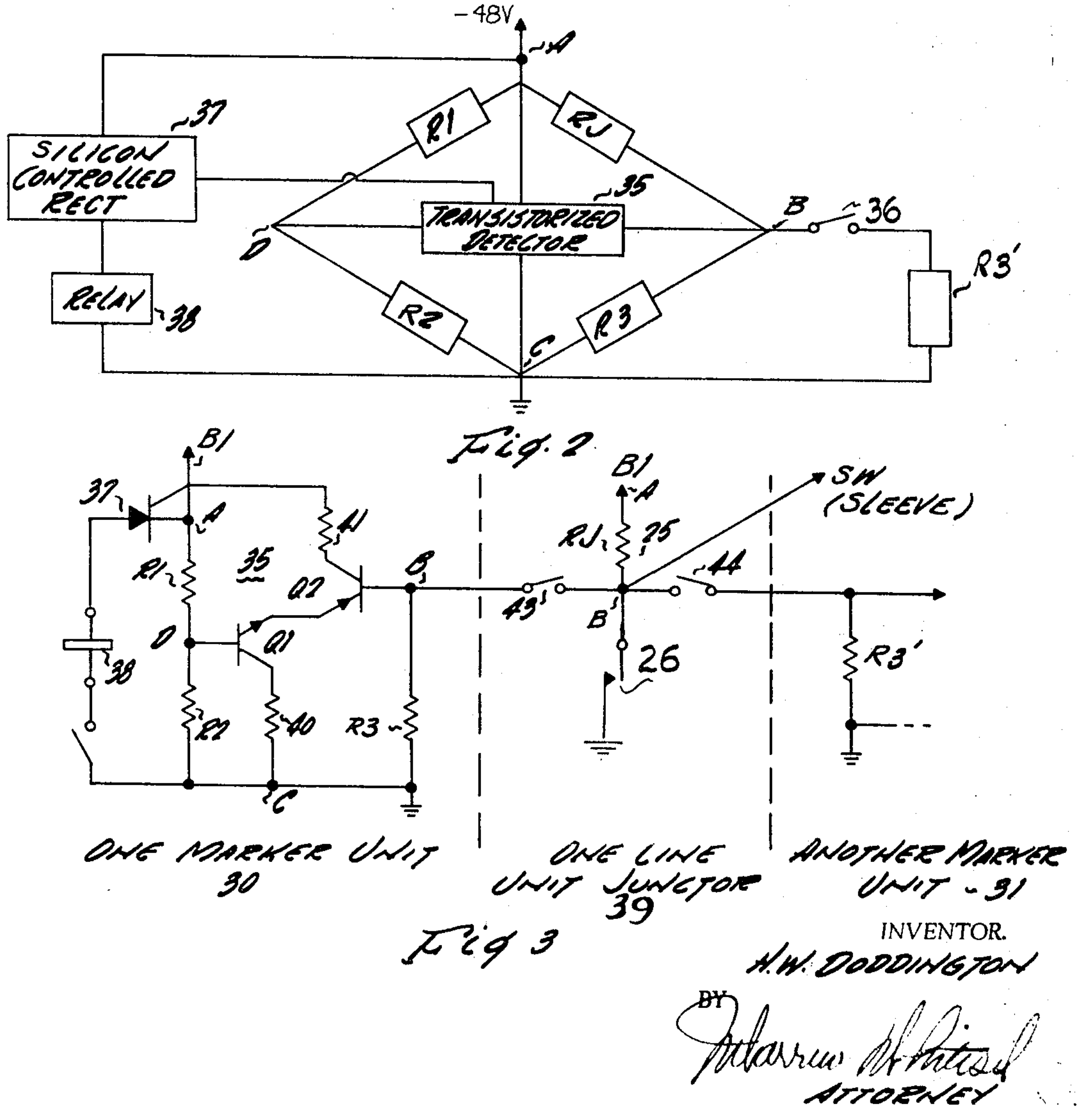
FIG. 2 is a simplified disclosure of a circuit which utilizes a bridge detector, in the manner taught by this invention, to make an idle test.
FIG. 3 is a schematic circuit diagram which shows the components in the bridge circuit of FIG. 2.

The circuit for accomplishing this idle test is shown broadly in FIG. 2. This circuit includes a resistor bridge R1, R2, R3, and R*j* connected at points A, C between a —48 v. battery and ground, respectively. An electronic detector 35 is connected across the points B, and D across which a null would appear if the bridge were in balance. However, the circuit values of these resistors are selected so that the bridge never is in balance.

Also connected to the point B is a switch 36 which is closed when the tested circuit is busy. This switch connects a second resistance R3' in parallel with the bridge resistor R3 to cause the voltage across the resistors R*j* and R3 to divide in a manner which is different than it divides when only the resistor R3 is present in the bridge. Thus, when the voltage divides across only the resistors R3 and R*j*, the point B is negative with respect to the point D. However, when the voltage divides across resistance R*j* and R3 in parallel with R3', the point B moves toward ground potential. The point D is now negative with respect to the point B. This change in the relative polarity of points B and D is detected by the detector 35. The resistance R3' should be equal or less than the resistance R3.

An electronic switching device 37 is connected to the detector 35 to insure a fast response to one of the unbalance conditions which may appear in the bridge. This switch 37 may be a silicon controlled rectifier (SCR). A relay 38, coupled to operate or not to operate depending upon the "off" or "on" condition of the electronic switch 37, insures a positive circuit response.

FIG. 3 shows the circuit actually used to accomplish the idle testing. To relate the schematic circuit of FIG. 3 to the block diagrams of FIGS. 1 and 2, the same reference characters are used to identify similar parts. The FIG. 3 drawing is divided into three parts, by vertical dot-dashed lines, to identify the two markers 30, 31 having access to the same junctor circuit 39. The circuit shown at 30 is in the first marker and used for making an idle test. Another identical test circuit (not shown) appears in every other marker having access to the junctor 39, as indicated at 31.

This idle test circuit includes three of the four resistors (R1, R2, R3) used in the test bridge. The fourth resistor 25 (or R*j*) is in the junctor 39. In addition, the marker includes two transistors Q1 and Q2 which are NPN and PNP types, respectively. A pair of resistors 40, 41 are provided to prevent thermal runaway. In one exemplary circuit, the following circuit values were used:

| | Ohms |
|---|---|
| R1 | 1500 |
| R2 | 1270 |
| R3 | 14K |
| Rj | 10K |
| **40** | 1200 |
| **41** | 1200 |

The transistors Q1 and Q2 were types 2N3394 and 2N398B, respectively. The SCR is type 2N3228.

Each test circuit is able to connect itself to the same junctor circuit 39 via either of two switches 43 and 44, depending upon which of the markers is conducting an idle test. In addition, the junctor 39 includes the switch 26 for applying a busy ground marking to a sleeve lead SW when the switch path connected thereto is extended to the junctor.

The circuit operates this way. Under normal conditions, current flows from battery B1 to the point A at a rate of about 40 ma., plus any current through the winding of the relay 38. At the point A, this current divides with about 20 ma. flowing through the gate electrode of the SCR 37, resistor 41, transistors Q1, Q2 and resistor 40 to ground G1. The other 20 ma. of the divided current flows through resistors R1, R2 to ground G1.

The current through the resistors R1, R2 causes a voltage division between the potentials of battery B1 and ground G1. The potential at point D is a constant base bias potential which will enable the transistor Q1 to turn "on" when the potential at point B is correct relative thereto (i.e. point B is negative relative to point D). Current also flows from a (−) 48 v. potential through the resistors 25, R3 to ground G1 to establish such negative potential at the point B and turn "on" the transistors Q1 and Q2.

With the described condition, current flows from battery B1 through the point A, cathode and anode electrodes of the SCR 37 and relay 38 to ground G1. The relay 38 operates to give an idler junctor reading. The marker responds by seizing the junctor. Thereafter, the contacts 26 close to apply a ground to point B. This ground potential turns "off" the transistors Q1, Q2, but not the SCR 37. For the duration of the call, the junctor holds the contacts 26 closed to mark itself busy.

If two markers test the junctor 39 simultaneously, current flows through the resistors R3 and R3′ in parallel. The potential at the point B is closer to ground than it is when only one marker is testing. This holds "off" the transistor Q2 in one or both of the markers. Therefore, simultaneous seizure by two or more markers is not possible.

Next, assume that the junctor is busy when tested. Contacts 26 are closed, and ground appears at point B. This holds "off" the transistors Q1, Q2, and prevents the flow of current to the gate of the SCR 37. The SCR remains "off" and the relay 38 does not operate—which is a busy signal. The marker then steps on to test the next junctor.

While the principles of the invention have been described above in connection with specific apparatus and application, it is to be understood that this description is made only by way of example and not as a limitation on the scope of the invention.

I claim:

1. A device for conducting a test to determine whether a circuit is busy or idle in a folded network comprising bridge means which is unbalanced in one direction when one test result obtains and unbalanced in the other direction when an opposite test result obtains, means for connecting said bridge to the circuit under test, which may be seized from opposite sides, means responsive to a simultaneous test of the same circuit by two or more of said devices for unbalancing said bridge in said other direction, and means responsive to an unbalance of said bridge in said other direction for barring access to said circuit under test.

2. The device of claim 1 wherein each of said bridges includes three components in the device conducting said test and one component in the circuit under test, whereby said one component in the circuit under test is common to two or more of said bridge circuits in said devices during said simultaneous tests by two or more of said devices, the current flow through said one component dividing between the bridges in said devices to cause said unbalance in said other direction.

3. The device of claim 2 wherein said bridge comprises a plurality of resistors connected between battery and ground, electronic detector means connected across said resistors at points which would have substantially the same potential if said bridge is in balance, said detector means comprising a fast operating electronic switch, and means responsive to the operation of said electronic switch for opening a test circuit.

4. A switching system comprising a plurality of markers and junctors, each of said markers having substantially identical test circuits for testing said junctors for busy or idle conditions, said test circuit comprising an electronic detector means having means for establishing a bias potential which turns a switching device "off" or "on," means in one marker responsive to busy conditions in said junctor for changing said bias to change the "off" or "on" state of said switch, means responsive to a later test of said busy junctor by another of said markers for changing the detector means bias in said other marker, and means responsive to the change of bias in said other marker for preventing said other markers from seizing the same junctor.

5. The system of claim 4 wherein said detector means comprises a resistor bridge connected between battery and ground, and said switching device is connected across points on said bridge which would have the same potential if said bridge were in balance, said bridge including three resistors in the marker and one resistor in the junctor under test, whereby said resistor in the junctor under test is common to two or more of said bridge circuits during said simultaneous tests, so that current through said common resistor divides between two bridge circuits to establish said bias potential, and means whereby the switching means in said markers are precluded from changing said "off" or "on" state responsive to potentials established by said divided current.

References Cited

UNITED STATES PATENTS

| | | |
|---|---|---|
| 2,859,402 | 11/1958 | Schaeve. |
| 2,895,012 | 7/1959 | Liston et al. |
| 3,156,778 | 11/1964 | Cirone. |
| 3,184,728 | 5/1965 | Hart et al. |

KATHLEEN H. CLAFFY, *Primary Examiner*.

T. W. BROWN, *Assistant Examiner*.